M. B. GIBERSON.
CAR COUPLING.
APPLICATION FILED DEC. 17, 1912.

1,138,650.

Patented May 11, 1915.
2 SHEETS—SHEET 1.

Witnesses

Inventor
Mason B. Giberson.
By Whittemore Hulbert + Whittemore
Attys

M. B. GIBERSON.
CAR COUPLING.
APPLICATION FILED DEC. 17, 1912.

1,138,650.

Patented May 11, 1915.
2 SHEETS—SHEET 2.

Witnesses
J. B. Ford
James P. Barry

Inventor
Mason B. Giberson.
By Whittemore, Hulbert & Whittemore
Attys

UNITED STATES PATENT OFFICE.

MASON B. GIBERSON, OF DETROIT, MICHIGAN, ASSIGNOR TO THOMAS H. SIMPSON, OF DETROIT, MICHIGAN.

CAR-COUPLING.

1,138,650.  Specification of Letters Patent.  Patented May 11, 1915.

Application filed December 17, 1912. Serial No. 737,223.

*To all whom it may concern:*

Be it known that I, MASON B. GIBERSON, a citizen of the United States of America, residing at Detroit, in the county of Wayne and State of Michigan, have invented certain new and useful Improvements in Car-Couplers, of which the following is a specification, reference being had therein to the accompanying drawings.

The invention relates to car couplers and has particular reference, first, to the construction by which wear in the coupling hook is automatically compensated for; a further feature of the invention is the construction of locking and releasing means; further the means for strengthening the shank; and further in various details of construction as hereinafter set forth.

Figure 1:
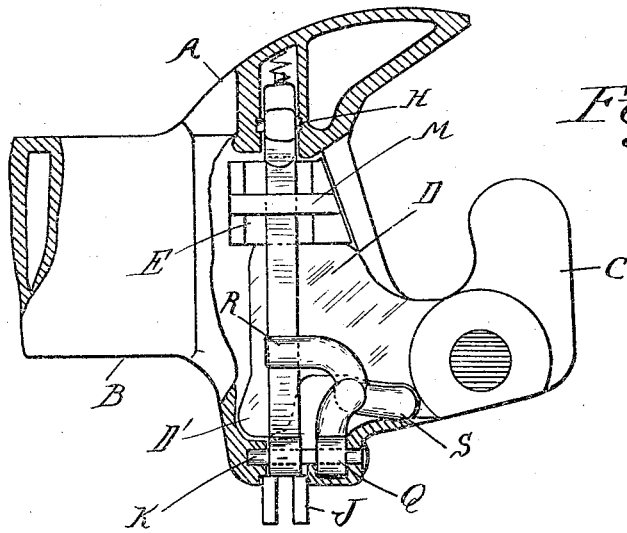
Figure 3:
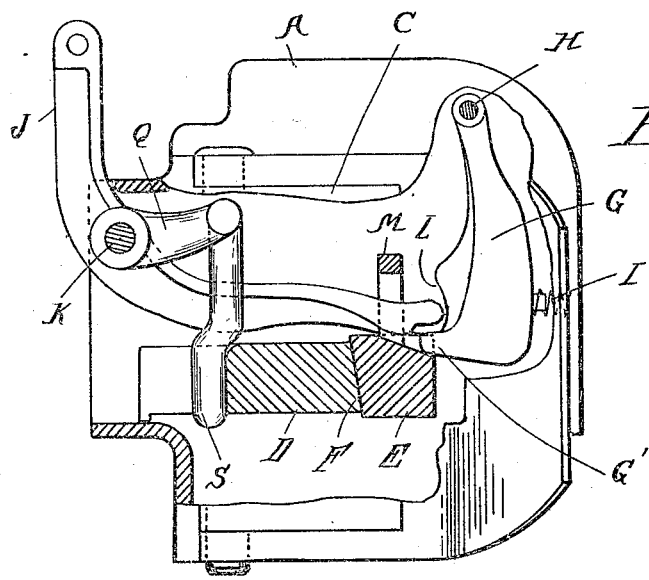
Figure 2:
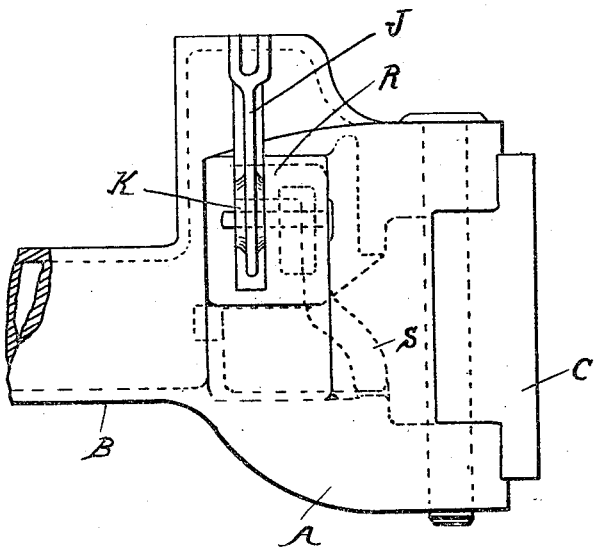
Figure 4:
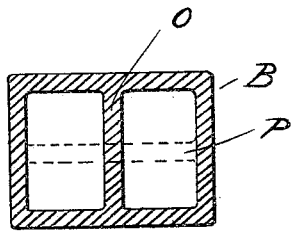

In the drawings: Figure 1 is a longitudinal section of the coupler on the line 1—1 of Fig. 2. Fig. 2 is a side elevation thereof. Fig. 3 is a transverse section on the line 3—3 of Fig. 2 looking in the direction of the arrow. Fig. 4 is a cross section through the coupler shank.

My improved coupler is of the standard Janney type, and comprises the usual element of the head A; shank B; pivotal hook C having a locking arm D; and the locking detent E arranged in the path of said arm when the coupler is locked.

In the use of couplers of this type it has been found that the impact of the locking arm against the detent, due to the stresses to which the coupler is almost constantly subjected, will cause a rapid wearing of the parts resulting in lost motion. This permits the hook to change its position so that the couplers frequently become accidentally detached. The present invention is designed to overcome this defect, first, by providing a wedge engagement between the locking arm of the coupling hook and the detent, which will compensate for wear therebetween; second, in the provision of means for positively holding the detent in its locking position, together with means for releasing it when the coupler is to be unlocked.

In detail, the adjacent faces of the detent E and the arm D are provided with inclined or complementary wedge-faces F, as shown in Fig. 1, so that whenever said detent drops by gravity into its locking position it will take up all clearance. The inclination of the wedge is well within the angle of friction so that the pull of the hook cannot cause disengagement; but to prevent any gradual working out of the wedge through vibration of the coupling hook, I have provided positive means for locking it down. This preferably consists of a dog G pivotally secured, as at H, within the body of the coupler and adapted to normally assume a position over the detent E, where it intercepts the upward movement thereof. The contacting faces of this dog and the detent E are arranged at such an angle that any wear will be automatically taken up by a further movement of the dog. If it is desired to insure the positive action of the dog, a spring I may be arranged to operate thereon as shown.

In unlocking the coupler, before the detent may be withdrawn, the dog G must be disengaged therefrom. This is preferably accomplished by a releasing mechanism of the following construction: J is the lever which is employed for raising the detent E and which as shown is fulcrumed at K at the side of the coupler and extends through a recess therein into the interior to a point above the detent E. The end of this lever extends into proximity to the dog G and the latter is provided with a cammed face L, so fashioned that in the initial movement of the lever the dog will be actuated to disengage the same from the detent. The detent is then raised by the engagement of the lever with a bail or other lifting member M, sufficient lost motion being provided for the lever to first disengage the dog as just described.

In the evolution of coupler construction the depth or vertical dimension of the coupler and hook has been increased from time to time. There has not, however, been a corresponding increase in the vertical dimension of the shank of the coupler for the reason that with standard car construction there is no available space for a larger shank. This forms an element of weakness in the construction and frequently couplers are broken at the point of union between the shank and head. To overcome this defect without the necessity of increasing the space limits required, I have strengthened the shank by placing internal strengthening ribs or braces therein.

As shown in Fig. 4, O is a rib or web extending vertically and centrally of the top and bottom walls of the coupler shank, and P is a horizontal web, both of said webs being formed integral with the coupler shank. These webs or brace members add materially to the strength of the coupler, while they do not in any way interfere with the performance of the usual functions or increase the external dimensions.

All standard couplers are provided with means for positively opening the hook, which generally consists of a lever actuated by the detent when the latter is raised, and which engages the locking arm of the hook to move the same outward. With my construction I have simplified this device by actuating the opening-lever directly from the releasing-lever J instead of indirectly through the detent. As shown, Q is the opening-lever which is arranged in a pocket at one side of the coupling hook, and is fulcrumed upon the same pin K which forms a fulcrum for the lever J. The lever Q is provided with two arms R and S, the former extending over and in the path of the lever J and the latter extending down outside of the arm D into proximity thereto. The arrangement is such that when the lever J is operated it will first unlock the dog and disengage the detent E, as previously described, after which it will impinge against the arm R, actuating the lever Q and causing the arm S to swing the arm D outward.

When the detent E is raised the dog G will swing inward and a forwardly-projecting lug G′ thereon passes beneath the detent to support the same in its raised position. This lug G′ is in the path of a lug D′ on the locking arm D of the knuckle, and consequently when the knuckle is open it will disengage the dog G from the detent, permitting the latter to rest upon the lug D′. Thus when the knuckle is closed the detent is free to drop into its locking position.

What I claim as my invention is:

1. In a car coupler, the combination with the coupling hook, of a wedge-shaped detent for locking said hook adapted to automatically compensate for wear, a dog for automatically engaging said detent in its locked position to hold the same from disengagement, and a lever for lifting said detent, also engaging said dog and adapted to disengage the same in advance of movement of the detent.

2. In a car coupler, the combination with a coupling hook, of a wedge-shaped dog for locking said hook adapted to compensate for wear, a dog adapted to engage and hold said detent in its locking position said dog including means for compensating for wear, and releasing means for said detent and dog adapted to disengage the latter in advance of the former.

3. In a car coupler, the combination with the coupling hook, of a wedge-shaped detent for locking said hook adapted to compensate for wear, a dog pivotally secured within the coupler to engage said detent and hold the same from movement, a lever for releasing said detent having a limited lost motion therewith, and a cam engagement between said lever and dog for disengaging the latter in advance of the movement of the detent.

In testimony whereof I affix my signature in presence of two witnesses.

MASON B. GIBERSON.

Witnesses:
JAMES P. BARRY,
H. E. BOWMAN.

Copies of this patent may be obtained for five cents each, by addressing the "Commissioner of Patents, Washington, D. C."